Figure 1:
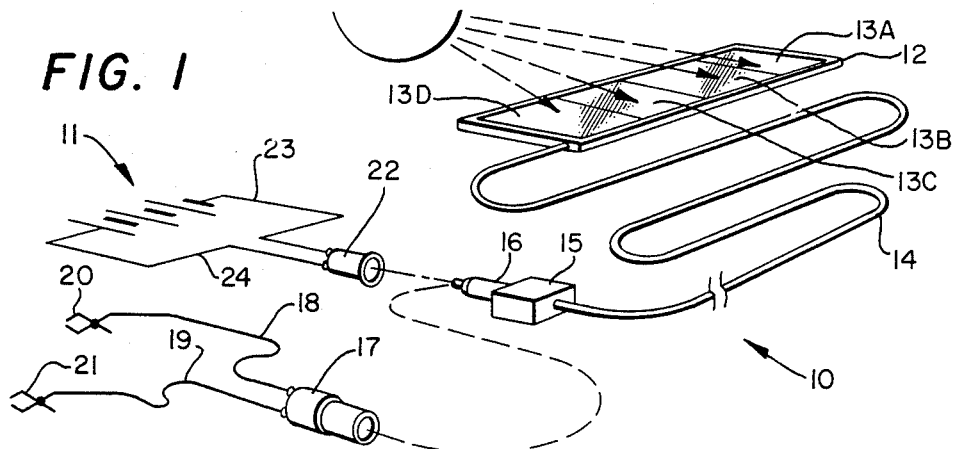

United States Patent [19]

Gali

[11] Patent Number: 4,871,959
[45] Date of Patent: Oct. 3, 1989

[54] SOLAR TRICKLE CHARGER FOR LEAD ACID BATTERIES

[76] Inventor: Carl E. Gali, 6414 Faircove Cir., Garland, Tex. 75043

[21] Appl. No.: 219,371

[22] Filed: Jul. 15, 1988

[51] Int. Cl.$^4$ .............................................. H02J 7/00
[52] U.S. Cl. ...................................... 320/61; 323/906
[58] Field of Search ...................... 320/2, 61; 323/906

[56] References Cited

U.S. PATENT DOCUMENTS

| | | | |
|---|---|---|---|
| 4,626,983 | 12/1986 | Harada et al. | 323/906 X |
| 4,644,256 | 2/1987 | Farias et al. | 323/906 X |
| 4,695,935 | 9/1987 | Oen et al. | 323/906 X |
| 4,786,851 | 11/1988 | Fuji et al. | 320/2 |

Primary Examiner—R. J. Hickey
Attorney, Agent, or Firm—Warren H. Kintzinger

[57] ABSTRACT

Multi-solar cell panel powered trickle chargers are provided for lead acid batteries with the solar cell panel power connected to a DC to AC inverter multi-vibrator having a center tap and opposite end connections to a primary coil of a transformer. The secondary coil of the transformer has opposite end connections to two opposite terminals of a four diode rectifier bridge. The other opposite connections of the four diode AC to DC rectifier bridge are connected to like polarity terminals of a battery with connection via an insert into a cigarette lighter holder in a vehicle, or into a receptacle with two wires with end clips connectable to the terminals of a battery. In one embodiment the connection is a steady state trickle charger while in another embodiment the circuitry out of the four diode AC to DC rectifier bridge includes a relatively small value capacitor connected across the bridge output terminals and, in one line, a zener diode, silicon controlled rectifier (SCR) and resistor network is included such that when the small capacitor reaches a discharge triggering voltage the zener diode is fired activating the SCR discharging at approximately 4 to 5 amps across the battery every few milliseconds.

9 Claims, 1 Drawing Sheet

U.S. Patent
Oct. 3, 1989
4,871,959

SOLAR TRICKLE CHARGER FOR LEAD ACID BATTERIES

This invention relates in general to battery chargers, and more particularly, to solar power trickle chargers for lead acid batteries.

Solar powered voltaic cell units in the past have been considered too expensive for use as battery chargers in that many photovoltaic cells heretofore have been required to develop the voltage level and power required. Lead acid batteries, particularly when inactive through prolonged periods of non-use ten to have plate corrosion build-up that is harmful and shortens battery life.

It is therefore a principal object of this invention to provide an economical, efficient solar trickle charger for batteries.

Another object is to provide such a solar trickle charger having a reduced number of photovoltaic cells producing an output charging for batteries.

A further object is to provide such a charger for lead acid batteries that through long periods of battery non-use counters battery plate corrosion build-up.

Still another object is to extend lead acid battery life some two to three times through use of such trickle chargers through periods of nonuse.

Features of the invention useful in accomplishing the above objects include, in a solar trickle charger for lead acid batteries, multi-solar cell powered trickle chargers, with the number of cells reduced to as low as four cells that are low voltage high current solar cells—1 to 2 volts with 1 to 2 amps output, for lead acid batteries with the solar cell panel power connected to a DC to AC inverter multi-vibrator having a center tap and opposite end connections to a primary coil of a transformer. The secondary coil of the transformer, that has a higher turns ration than the primary coil such as to provide an output unloaded voltage in the range of some thirty to forty volts AC, has opposite end connections to two opposite terminals of a four diode rectifier bridge. The other opposite connections of the four diode AC to DC rectifier bridge are connected via leads including a limiting resistor to like polarity terminals of a battery with connection of the leads through a plug insert into a cigarette lighter holder in a vehicle, or into a receptacle with two wires with end clips connectable to the terminals of a battery. In one embodiment the connection is a steady state trickle charger while in another embodiment the circuitry out of the four diode AC to DC rectifier bridge includes a relatively small value capacitor connected across the bridge output terminals and, in one line, a zener diode, silicon controlled rectifier (SCR) and resistor network is included such that when the small capacitor reaches a discharge triggering voltage the zener diode is fired activating the SCR discharging at approximately 4 to 5 amps across the battery every few milliseconds.

Specific embodiments representing what are presently regarded as the best modes of carrying out the invention are illustrated in the accompanying drawing.

In the drawing:

FIG. 1 represents a perspective view of a solar trickle charger for lead acid batteries shown to have a solar cell panel connected through a lead cable to a circuit box having a connector plug insertable into a cigarette lighter holder in a vehicle connected to the vehicle battery or into a receptacle with clip wires connectable to the terminals of a battery.

Figure 2:
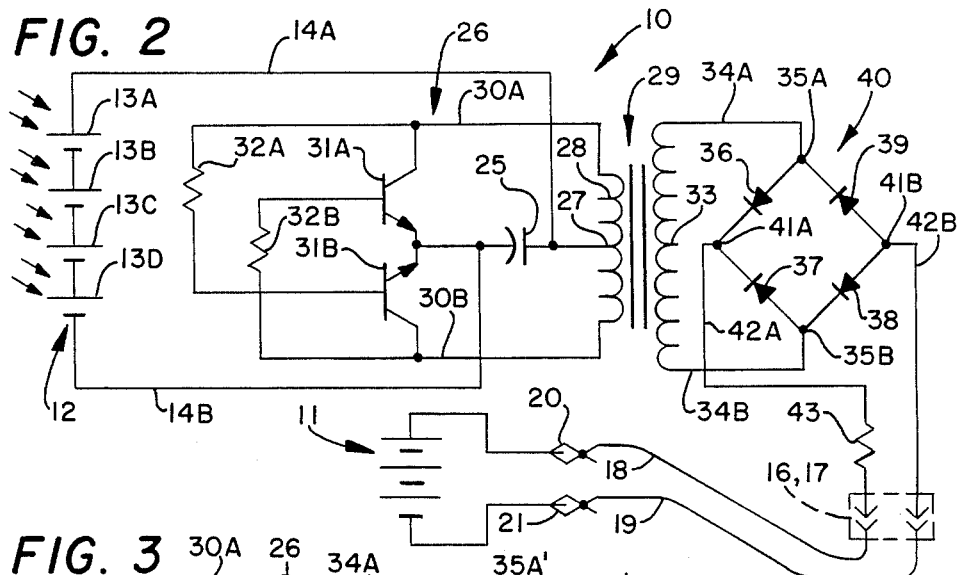

FIG. 2, a schematic view of a steady state trickle charger; and

Figure 3:
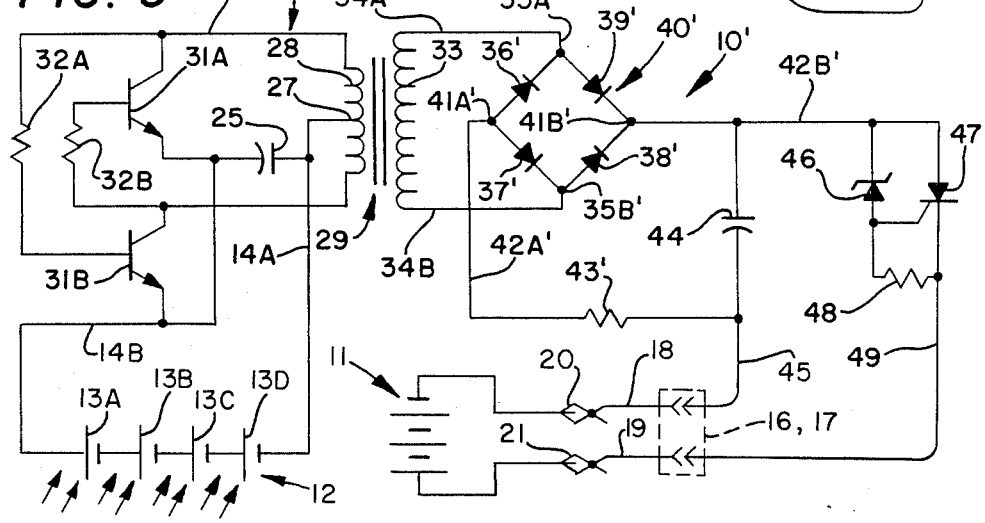

FIG. 3, a schematic view of a pulse output trickle charger having approximately fifty pulses per second using a capacitor discharge firing circuit with amperage of the short duration (typically 100 m sec.) pulses controlled in the range of five to forty amps.

Referring to the drawing:

The solar trickle charger 10, of FIG. 1, for lead acid batteries 11 is shown to have a solar cell panel 12 with four solar cells 13A, 13B, 13C and 13D shown to be connected through a two wire cable 14 to a circuit box 15. A connector element 16 on the circuit box 15 may be inserted into a connector receptacle 17 having slip wires 18 and 19 extended to clips 20 and 21. The connector element 16 also may be sized and configured to fit in a vehicle cigarette lighter receptacle 22 that has wire 23 and wire 24 connections to opposite ends of vehicle lead acid battery 11.

Referring also to FIG. 2 the solar trickle charger 10 is a steady state trickle charger for lead acid batteries 12 with the number of cells in the multi-solar call panel 12 reduced to as low as four cells 13A, 13B, 13C and 13D series connected that as low voltage high current solar cells together produce 1 to 2 volts with 1 to 2 amps output. The multi-solar cell panel 12 is connected through wires 14A and 14B of connecting cable 14 to opposite sides of capacitor 25 in DC to AC inverter multi-vibrator circuit 26. Wire 14A is also connected to the center tap of primary coil 28 in transformer 29. The opposite ends of coil 28 are connected through lines 30A and 30B to the collectors, respectively, of transistors 31A and 31B and on, respectively, through resistors 32A and 32B to the bases of NPN transistors 31B and 31A.

The secondary coil 33 of transformer 29 has a higher turns ratio than the primary coil 28 such as to produce an output unloaded voltage in the range of some thirty to forty volts AC and has its opposite ends connected through lines 34A and 34B to two opposite terminals 35A and 35B of a four diode 36, 37, 38 and 39 AC to DC rectifier bridge 40. The other two opposite terminals 41A and 41B of the AC to DC rectifier bridge 40 are connected through lines 42A and 42B, with a limit resistor 43 in one of the lines, and connector 16 (17) to and through lines 18 and 19 to connection by clips 20 and 21 to, respectively, the positive and negative terminals of battery 11.

Referring now to the pulse output trickle charger 10' embodiment of FIG. 3, the circuitry from the multi-solar cell panel 12 through the DC to AC inverter multi-vibrator circuit 26 to and through the transformer 29 is the same as with the steady state embodiment of FIG. 2 and the description therefor will not be repeated again here. The opposite ends of transformer secondary coil 33 are connected through lines 34A and 34B to two opposite terminals 35A' and 35B' of a four diode 36', 37', 38' and 39' AC to DC rectifier bridge 40'. The other two opposite terminals 41A' and 41B' of the bridge 40' are connected through line 42A', limit resistor 43' to and through connector 16 (17) and line 18 to a clip 20 connection to the negative terminal of battery 11, and to line 42B'. The line 42B' is connected through capacitor 44 to the extension 45 of line 42A' after limit resistor 43'. The line 42B' is also connected to the cathode of zener diode 46 and to the anode of silicon controlled rectifier (SCR) 47. The anode of zener diode 46 is connected through bias resistor 48 to line 49 and the anode of zener diode 46 is also connected to the control electrode of the SCR 47 the cathode of which is connected through line 49 to the connectror 16 (17), on through line 19 and clip 21 to the positive terminal of battery 11.

Typical values for components in both embodiments include:

| Capacitor 25 | 450 μf at 6 volts |
|---|---|
| Resistors 32A and 32B | 22 Ohms |
| Diodes 36, 37, 38 and 39 | 1 amp diodes |
| Limiting resistor 43 | 15 ohms | and additional components in the embodiment of FIG. 3:

| Capacitor 44 | 30 μf at 50 volts |
|---|---|
| Zener Diode 46 | 15 volt zener diode |
| SCR 47 | 6 amp SCR |
| Resistor 48 | 150 ohm resistor. |

Both of these embodiments may be used for trickle charging six, twelve or twenty four volt lead acid batteries at approximately one watt. The FIG. 3 embodiment provides a pulse type output at approximately fifty pulses per second with repeated discharges of the capacitor 44. The amperage of the pulses at short duration are controllable to the range of five to forty amps per pulse of approximately 100M seconds duration. This pulse type trickle charging is particularly helpful in keeping lead acid battery plates cleaner during such trickle charging through extended intervals of battery non-use.

Whereas this invention has been described with respect to several embodiments thereof, it should be realized that various changes may be made without departure from the essential contributions to the art made by the teachings hereof.

I claim:

1. A solar trickle charger for batteries comprising: a multi-solar cell power source circuit; a DC to AC inverter multi-vibrator circuit connected to said multi-solar cell power source; a transformer with a primary coil a part of said DC to AC inverter multi-vibrator circuit; and a secondary coil; a four diode rectifier bridge circuit having a first set of opposite terminals connected to said secondary coil, and a second set of opposite terminals connectable to the two terminals of a battery; wherein there is a higher turns ratio with more turns in said secondary coil than in said primary coil yielding a higher AC voltage output from said secondary coil; said DC to AC inverter multi-vibrator circuit includes two transistors having a common electrode connection of first electrodes of said transistors connected to a first capacitor connected to a tap of said primary coil; said multi-solar cell power source circuit having a first lead and a second lead with said first lead connected to the junction of said first capacitor and said tap of said primary coil, and with said second lead connected to the junction of said first electrode of said transistors common connection and said first capacitor; and with opposite ends of said primary coil connected to second electrodes of said transistors and to resistors connected to the bases, respectively, of said transistors; said two transistors are NPN type transistors with said common electrode connection of said transistors a common connection between emitters of said two transistors; the opposite ends of said primary coil are connected to the collectors of said NPN transistors and each on through said resistors, respectively, to the base of the opposite transistor of said two transistors from transistor collector connections; a current limiting resistor is included in connection means to the two terminals of a battery; said connection means includes a two wire plug and socket connection; said multi-solar cell power source circuit has a two wire out line cable connection to circuitry within a circuit box containing said DC to AC inverter multi-vibrator circuit, said transformer, and said AC to DC four diode rectifier bridge circuit; the plug of said two wire plug and socket connection is mounted on said circuit box; said trickle charger is a pulse output trickle charger including a second capacitor connected across said second set of opposite terminals of the four diode rectifier bridge circuit; and trigger circuit means including a zener diode and a SCR with a control electrode connected to the anode of the zener diode, connected in said connection means from said four diode bridge rectifier subject to being biased to conduction in repeated successive pulses of conduction when said second capacitor is repeatedly charged to a voltage bias level that is said trigger circuit means voltage bias to conduction level.

2. The solar trickle charger for batteries of claim 1, wherein an output line from said second set of opposite terminals is connected to said trigger circuit means comprising, connection of said output line to the cathode of a zene diode having an anode connection to and through resistance means to a continuation of said output line after a silicon controlled rectifier (SCR) inserted in the output line with anode toward the output connector of the four diode rectifier bridge and cathode to the continuation of said output line; and connection of the anode of the zener diode to the control electrode of said silicon controlled rectifier.

3. A solar trickle charger for batteries comprising: a multi-solar cell power source circuit; a DC to AC inverter multi-vibrator circuit connected to said multi-solar cell power source; a transformer with a primary coil a part of said DC to AC inverter multi-vibrator circuit; and a secondary coil; a four diode rectifier bridge circuit having a first set of opposite terminals connected to said secondary coil, and a second set of opposite terminals connectable to the two terminals of a battery; wherein there is a higher turns ratio with more turns in said secondary coil than in said primary coil yielding a higher AC voltage output from said secondary coil; said trickle charger is a pulse output trickle charger including a capacitor connected across said second set of opposite terminals of the four diode rectifier bridge circuit; and trigger circuit means including a zener diode and a SCR with a control electrode connected to the anode of the zener diode, connected to said second set of opposite terminals of the four diode rectifier bridge circuit subject to being biased to conduction in repeated successive pulses of conduction when said capacitor is repeatedly charged to a voltage bias level that is said trigger circuit means voltage bias to conduction level.

4. The solar trickle charger for batteries of claim 3, wherein an output line from said second set of opposite terminals is connected to said trigger circuit means comprising, connection of said output line to the cathode of a zener diode having an anode connection to and through resistive means to a continuation of said output line after a silicon rectifier (SCR) inserted in the output line with anode toward the output connector of the four diode rectifier bridge and cathode to the continuation of said output line; and connection of the anode of the zener diode to the control electrode of said silicon controlled rectifier.

5. The solar trickle charger for batteries of claim 4, wherein said DC to AC inverter multi-vibrator circuit includes two transistors having a common electrode connection of first electrodes of said transistors connected to a capacitor connected to a tap of said primary coil; said multi-solar cell power source circuit having a first lead and a second lead with said first lead connected to the junction of said capacitor and said tap of said primary coil, and with said second lead connected to the junction of said first electrode of said transistors common connection and said capacitor; and with opposite ends of said primary coil connected to second electrodes of said transistors and to resistors connected to the bases, respectively, of said transistors.

6. The solar trickle charger for batteries of claim 5, wherein said two transistors are NPN type transistors with said common electrode connection of said transistors a common connection between the emitters of said two transistors.

7. The solar trickle charger for batteries of claim 6, wherein the opposite ends of said primary coil are connected to the collectors of said NPN transistors and each on through said resistors, respectively, to the base of the opposite transistor of said two transistors from transistors of the collector connections.

8. The solar trickle charger for batteries of claim 7, wherein a current limiting resistor is included in connection means to the two terminals of a battery.

9. The solar trickle charger for batteries of claim 8, wherein said connection means includes a two wire plug and socket connection.

* * * * *